(12) United States Patent
McCrady

(10) Patent No.: US 7,746,939 B2
(45) Date of Patent: Jun. 29, 2010

(54) METHODS AND APPARATUS FOR ENCODING INFORMATION IN A SIGNAL BY SPECTRAL NOTCH MODULATION

(75) Inventor: Dennis D. McCrady, Holmdel, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 927 days.

(21) Appl. No.: 11/191,910

(22) Filed: Jul. 29, 2005

(65) Prior Publication Data
US 2007/0025456 A1 Feb. 1, 2007

(51) Int. Cl.
*H04K 1/10* (2006.01)
*H04L 27/28* (2006.01)

(52) U.S. Cl. ............... 375/260; 375/303; 375/334; 375/269; 375/272; 375/259; 455/59; 455/13.1; 455/42; 178/32; 380/34

(58) Field of Classification Search .............. None
See application file for complete search history.

(56) References Cited

U.S. PATENT DOCUMENTS

| | | | |
|---|---|---|---|
| 4,156,877 A | 5/1979 | Piesinger | |
| 4,742,393 A * | 5/1988 | Sugai et al. ............... 348/725 |
| 5,150,377 A | 9/1992 | Vannucci | |
| 5,365,516 A * | 11/1994 | Jandrell ............... 370/335 |
| 5,377,223 A | 12/1994 | Schilling | |
| 5,727,026 A * | 3/1998 | Beukema ............... 375/296 |
| 5,748,667 A | 5/1998 | Dyckman | |
| 5,872,806 A | 2/1999 | Enderlein et al. | |
| 5,974,082 A | 10/1999 | Ishikawa et al. | |
| 6,046,968 A * | 4/2000 | Abramovitch et al. ... 369/47.28 |
| 6,163,563 A * | 12/2000 | Baker et al. ............... 375/130 |
| 6,411,645 B1 | 6/2002 | Lee et al. | |
| 6,453,168 B1 | 9/2002 | McCrady et al. | |
| 6,538,586 B1 * | 3/2003 | Cavin et al. ............... 341/106 |
| 6,631,165 B1 * | 10/2003 | Lambert et al. ............ 375/259 |
| 6,711,145 B2 | 3/2004 | Schilling | |
| 6,724,335 B1 * | 4/2004 | Gomez et al. ............... 341/144 |
| 6,801,782 B2 | 10/2004 | McCrady et al. | |
| 6,937,639 B2 * | 8/2005 | Pendergrass et al. ........ 375/135 |
| 7,366,243 B1 | 4/2008 | McCrady | |
| 7,623,442 B2 * | 11/2009 | Laroia et al. ............... 370/208 |
| 2002/0097182 A1 * | 7/2002 | Goren et al. ............ 342/357.07 |
| 2002/0126647 A1 | 9/2002 | Schilling | |
| 2003/0091122 A1 * | 5/2003 | Humphreys et al. ........ 375/295 |

(Continued)

*Primary Examiner*—Shuwang Liu
*Assistant Examiner*—Gina McKie
(74) *Attorney, Agent, or Firm*—Edell, Shapiro & Finnan, LLC

(57) ABSTRACT

A spectral notch modulation technique for encoding information in a signal involves transforming the signal into the frequency domain via a fast Fourier transform (FFT) of length N, such that the signal is represented by N frequency bins, selectively nulling M of the N frequency bins, where nulled combinations of M frequency bins respectively correspond to encoded information bits, transforming the selectively nulled signal to the time domain via an inverse FFT, and transmitting the selectively nulled signal. At the receiving end, the signal is demodulated to recover the encoded information by transforming the signal into the frequency domain via a fast Fourier transform (FFT) of length N, identifying the set of M nulled frequency bins among the N frequency bins, and converting the set of M nulled frequency bins to corresponding information bits.

28 Claims, 4 Drawing Sheets

U.S. PATENT DOCUMENTS

| | | | |
|---|---|---|---|
| 2003/0103584 A1* | 6/2003 | Bjerke et al. | 375/340 |
| 2003/0123384 A1 | 7/2003 | Agee | |
| 2003/0215001 A1 | 11/2003 | Lemois et al. | |
| 2004/0170228 A1* | 9/2004 | Vadde | 375/260 |
| 2004/0232983 A1* | 11/2004 | Cheung et al. | 330/149 |
| 2006/0126592 A1* | 6/2006 | Hassan et al. | 370/349 |
| 2009/0245422 A1* | 10/2009 | Sampath et al. | 375/302 |

* cited by examiner

METHODS AND APPARATUS FOR ENCODING INFORMATION IN A SIGNAL BY SPECTRAL NOTCH MODULATION

BACKGROUND OF THE INVENTION

1. Field of the Invention

The present invention relates to methods and apparatus for encoding information in a signal by spectral notch modulation.

2. Description of the Related Art

Systems that transmit and receive digital signals to convey or collect information are being refined continually to improve signal throughput. A variety of factors affect the potential throughput of information in such systems, including: the signal bandwidth, the signal data rate, the transmit power, transmit beam directivity, transmission distances, receiver sensitivity, noise and interference levels, multipath reflections, the acceptable bit error rate, the modulation scheme, the error correction coding scheme, the amount of overhead and control signals required within the transmission protocol, and the sophistication of the transmitter and receiver equipment. Typically, information is encoded into a transmitted signal using one of variety of known modulation schemes, such as phase shift keying, frequency shift keying, quadrature amplitude modulation, amplitude modulation, or frequency modulation. By demodulating the signal at the receiver, the original information can be recovered.

Virtually all signaling systems can benefit from increased signal throughput. For example, in systems that primarily convey communication information such as data, voice, video, etc., it would be desirable to increase the proportion of the modulated signal that is devoted to the communication information while minimizing throughput lost due to the necessity of conveying overhead and control signals. Likewise, in systems that transmit navigation signals, such as time-of-arrival (TOA) ranging signals, it would be desirable to additionally convey communication information without having to transmit an excessive number of non-navigation messages that reduce the time available for navigation signals.

For example, U.S. Pat. Nos. 6,453,168 and 6,801,782, the disclosures of which are incorporated herein by reference in their entireties, disclose a state-of-the-art position location and communication system that provides accurate, reliable three-dimensional position determination of a handheld or portable, spread spectrum communication device within milliseconds without interruption of voice or data communications. Using spread spectrum waveforms and processing techniques, the system is capable of determining the position of a device to an accuracy of less than one meter and communications performance commensurate with the modulation and error correction coding that is employed in a severe multipath environment.

The position determining technique is based on transmitting and receiving TOA ranging packets that are used to measure the range between a master communication device and reference communication devices. Using trilateration, the measured ranges are transformed into the (x, y, z) location coordinates of the master communication device. The TOA ranging process uses a great deal of radio network bandwidth, leaving very little for communication of voice data or video information. As the TOA ranging update rate and number of references being used increase, the lack of air time for communications is compounded.

As described in the aforementioned patents, TOA ranging signals are exchanged between pairs of communication devices to determine the range between the devices. Once the exchange is complete, at least one additional message must be transmitted between the communication devices to supply information necessary to support the computation of the range and position. Theoretically, this data could be conveyed by adding data fields to the TOA waveform of the TOA ranging signals. However, this approach would add considerable complexity to the transmitter and receiver hardware as well as the waveform itself and would increase the duration of the TOA ranging signals. As with overhead signals that accompany the transmission of communication signals, it would be desirable to convey necessary support signals without reducing the time available for transmitting the primary signals of interest. More generally, it would be advantageous in many signaling systems to supplement the information throughput achievable with the primary modulation scheme with some form of additional signal throughput.

SUMMARY OF THE INVENTION

In accordance with an aspect of the invention, a method of modulating a signal to encode information includes: transforming the signal into the frequency domain via a fast Fourier transform (FFT) of length N, such that the signal is represented by N frequency bins; selectively nulling M of the N frequency bins, wherein nulled combinations of M frequency bins respectively correspond to encoded information bits; transforming the selectively nulled signal to the time domain via an inverse FFT; and transmitting the selectively nulled signal. At the receiving end, the signal can be demodulated to recover information encoded via spectral notch modulation by transforming the signal into the frequency domain via an FFT of length N, identifying the set of M nulled frequency bins among the N frequency bins, and converting the set of M nulled frequency bins to the corresponding information bits.

The transmitted signal can be, for example, a spread spectrum signal. Optionally, the signal can additionally be modulated via a conventional modulation technique such as, phase shift keying, frequency shift keying, quadrature amplitude modulation, amplitude modulation, or frequency modulation. While the invention does not require using spectral notch modulation in combination with a conventional modulation technique, when spectral notch modulation is added to a system using an existing modulation scheme, additional information throughput can be achieved without increasing signal bandwidth, transmit power, or the data rate. Thus, for example, conventional modulation can be used to convey one type of information in a signal, such as time-of-arrival ranging message, while spectral notch modulation can be used to convey another type of information in the same signal, such as supporting communication data or overhead signals. In this context, the invention overcomes the aforementioned difficulty by making it feasible to use TOA ranging packets for both location and data communications. Bit patterns are superimposed on the chips used in the ranging packets allowing both ranging and communication to occur simultaneously. This helps to alleviate the frequency allocation problem by making more efficient use of the spectrum.

In accordance with another aspect of the invention, an apparatus for encoding information in a signal by spectral notch modulation includes: a processor that generates a digital time-domain signal having a bandwidth that is divisible into frequency bins; an encoding module that selects a set of frequency bins corresponding to information bits to be encoded; a spectral notch modulator that converts the digital time-domain signal to a frequency-domain signal, excises from the frequency-domain signal the set of frequency bins selected by the encoding module, and converts the excised frequency-domain signal to an excised time-domain signal; and a digital-to-analog converter that converts the excised digital time-domain signal to an analog signal for transmission. Here again, the frequency domain signal includes N frequency bins and the spectral notch modulator excises M of the N frequency bins, wherein nulled combinations of M frequency bins respectively correspond to encoded information bits.

The spectral notch modulator can include a discrete Fourier transform module that converts the digital time-domain signal to the frequency-domain signal comprising a plurality of frequency-domain samples corresponding to respective frequency bins; an excision module that selectively removes the frequency bins selected by the encoding module to cause spectral nulling of the frequency bins selected by the encoding module; and an inverse discrete Fourier transform module that converts the excised frequency-domain signal to the excised time-domain signal. The digital time-domain signal can be a baseband signal, which is up-converted by a digital mixer after excision to an intermediate frequency and then supplied to the digital-to-analog converter. The analog IF signal can then supplied to an RF transmission module for transmission. The apparatus can be a spread spectrum modem of a mobile communication device that communicates with other communication devices in a network.

In accordance with yet anther aspect of the invention, an apparatus for demodulating a signal to recover information encoded in the signal via spectral notch modulation includes: an analog-to-digital converter that converts a received signal to a received digital time-domain signal; and a processor that converts the received digital time-domain signal to a frequency-domain signal comprising a plurality of frequency-domain samples corresponding to respective frequency bins, identifies a subset of the frequency bins that were nulled to effect the spectral notch modulation, and converts the subset of the frequency bins to corresponding information bits. The apparatus can further include a time of arrival processor that determines a time of arrival of the received signal from the received time-domain signal and a communications acquisition processor that acquires the received signal from the received time-domain signal.

The above and still further objects, features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DESCRIPTION OF THE PREFERRED EMBODIMENTS

Figure 1:
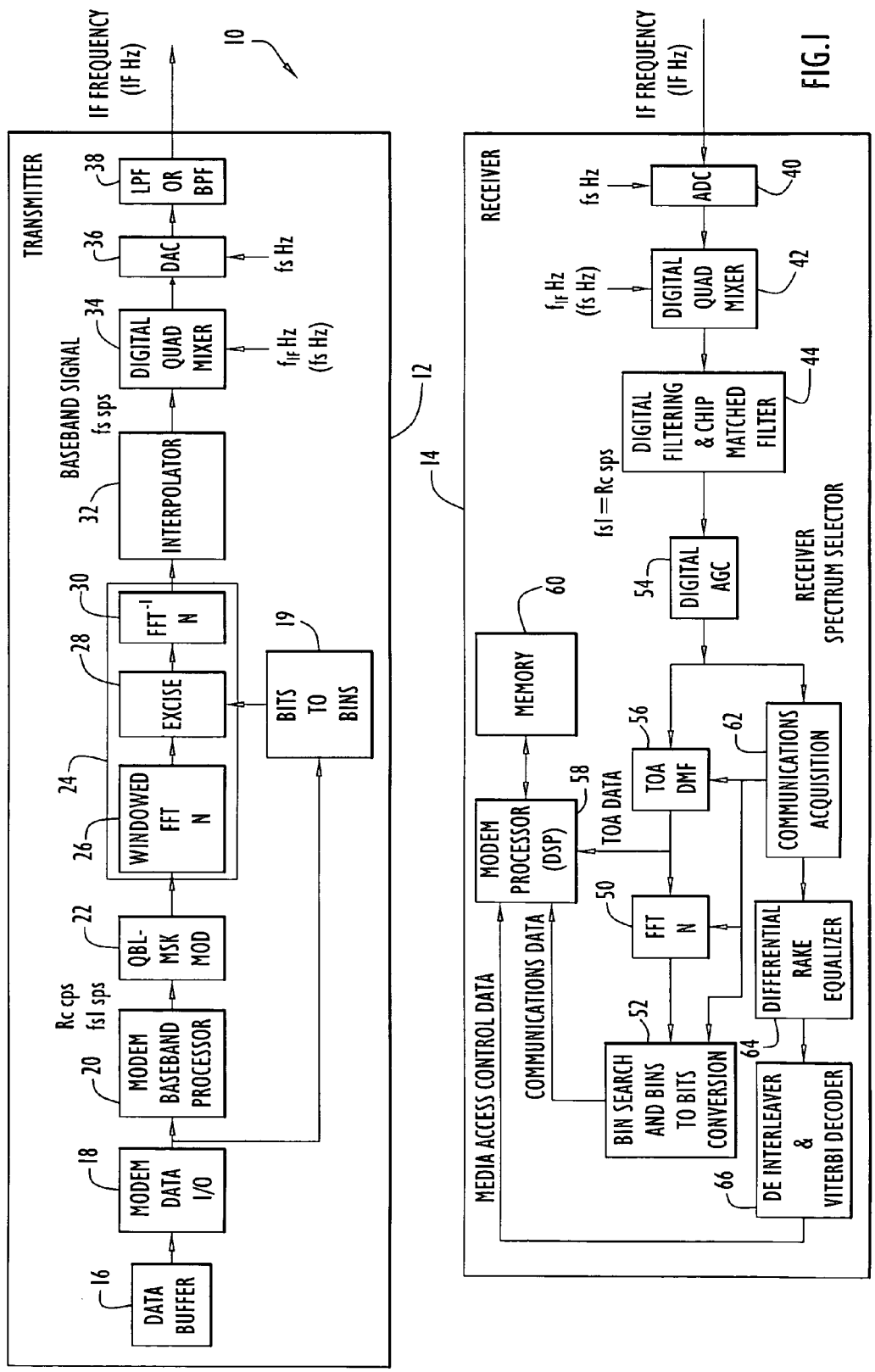
FIG. 1 is a functional block diagram illustrating a modem architecture employing spectral notch modulation in accordance with an exemplary embodiment of the present invention.

The following detailed explanations of FIG. 1-4 and of the preferred embodiments reveal the methods and apparatus of the present invention. In accordance with an important aspect of the invention, information is encoded in a signal by notching out portions of the spectrum of the signal in a selective manner. The bandwidth of the signal can be divided into segments, for example, by performing a fast Fourier transform (FFT) on the signal to produce some number of frequency bins. A code of missing frequency bins can be generated by notching out or "nulling" a selected subset of the frequency bins (i.e., the signal is modified so that essentially no signal energy is transmitted in these frequency bins). The code of missing frequency bins can be related to a bit sequence, such that bits of information can be encoded in the signal by selectively notching sets of frequency bins in the signal to form symbols. If the total number of frequency bins is N and combinations of M frequency bins are nulled, the number of combinations of N frequency bins M at a time is given by:

$$\binom{N}{M} = \frac{N!}{M!(N-M)!}$$

For example, if the total number of frequency bins is 64, and 3 of the bins are notched out at a time, there are 41,664 different combinations of 3-bin sets of notched frequency bins within the overall set of 64 bins. Thus, by selectively nulling frequency bins, many distinct signals comprising different notched bin sets, or symbols, can be transmitted. In effect, this example is comparable to transmitting 15 binary bits (which provides 32,768 combinations) per symbol at a rate equal to the inverse of the FFT block time. The invention is not limited to any particular number of frequency bins or notched frequency bins.

At the transmitter, input information in the form of bits of data is translated into a corresponding set of frequency bins to be nulled, and the signal is transmitted with the appropriate bins nulled. At the receiver, it is determined which of the bins were nulled, and the detected set of nulled bins is converted back into the corresponding information bits. The technique can be implemented in the transmitter as follows. The baseband signal is supplied to an excision module that selectively removes certain frequency bins from the baseband signal. Specifically, an FFT is applied to the baseband signal to produce a frequency domain signal. Selected frequency bins of the FFT are zeroed based on the values of the bits to be transmitted (essentially there is a predetermined encoding or correspondence between values of the bits and combinations of nulled bins). Once the selected frequency bins have been excised, the signal is returned to the time domain via an inverse FFT, then up-converted to IF and RF for transmission. Thus, the term spectral notch modulation refers to the selective removal of portions (e.g., frequency bins) of the frequency spectrum of a signal, wherein certain combinations of removed portions of the spectrum represent certain information symbols which in turn correspond to a set of binary bits. As use herein, the terms "nulled," "notched," "excised," and "zeroed" refer to the removal or exclusion of energy from certain portions of the frequency spectrum of a signal.

The signal to which this technique is applied can be, for example, a direct sequence spread spectrum (DSSS) communication signal. Note that the signal itself can convey data or be encoded in a conventional manner. For example, the input baseband signal can be modulated (e.g., by phase shift keying, quadrature amplitude modulation, etc.) to carry bits of information, and the bits can be encoded via a pseudonoise (pn) code (as in DSSS signals). Thus, in this context, the spectral notch modulation is essentially an overlay on an otherwise conventional signal already encoded in a conventional manner to transmit information. Nevertheless, the invention is not limited to use of spectral notch modulation in combination with other modulation techniques, and spectral notch modulation can be used as the sole technique for encoding information into a signal.

For purposes of illustration, the spectral notch modulation technique is described herein in the context of a direct sequence spread spectrum modem. However, it will be understood that the described technique can be employed in virtually any communication device required to transmit or receive wireless (free space) signals and is not limited to any particular modem configuration. As used herein and in the claims, a communication device is any device capable of transmitting and/or receiving signals, including but not limited to: a fixed-position or mobile RF transmitter or receiver, a handheld or body-mounted radio; any type of wireless telephone (e.g., analog cellular, digital cellular or satellite-based); a pager or beeper device; a PDA; a radio carried on, built into or embedded in a ground-based or airborne vehicle; a satellite-mounted transmitter or receiver; or any electronic device equipped with wireless transmission or reception capabilities, including multimedia terminals capable of transmitting and/or receiving audio, video and data information.

FIG. 1 illustrates a block diagram of a spread spectrum modem 10 that performs encoding and decoding of information via a spectral excision function which is used to implement spectral notch modulation. The architecture depicted in FIG. 1 is a conceptual diagram illustrating major functional units, and does not necessarily illustrate physical relationships. For spectral notch modulation, the synchronization and media access control (MAC) functions of the modem are combined with new spectral notch modulation functions described below. Without spectral notch modulation, the modem depicted in FIG. 1 would perform communication and TOA ranging functions much like those described in the aforementioned U.S. Pat. Nos. 6,453,168 and 6,801,782. Modem 10 includes a transmitter 12 and a receiver 14. Transmitter 12 functions to convert an outbound digital signal to an intermediate frequency, spread spectrum signal that is subsequently up-converted to RF and transmitted via an antenna (not shown). Receiver 14 processes a received signal after down-conversion to IF and essentially recovers the transmitted waveform and information contained therein.

The signal to be transmitted or received by modem 10 can be any of a variety of communication or navigation signals. For example the signal can be a communication signal containing data, audio (voice) or video information. The signal can also be a signal used in navigation, such as a ranging pulse used to determine the position of a communication device or the range to another device or object by precisely measuring time of arrival, as described in the aforementioned patents. More particularly, the systems described in these documents employ a two-way, round-trip ranging message scheme in which the time of arrival of the ranging messages is accurately determined to yield accurate range estimates used to calculate the position of a mobile radio via trilateration. A master mobile radio transmits outbound ranging messages to plural reference radios. The reference radios respond by transmitting reply ranging messages each indicating the location of the reference radio. Upon reception of the reply ranging message, the master radio determines the signal propagation time, and hence range, by subtracting a known turn around time (i.e., the time between reception of the outbound ranging message and the transmission of the reply ranging message) and internal processing delays from the elapsed time between transmission of the outbound ranging message and the time of arrival of the reply message. In this manner, the individual radios do not need to be synchronized to a common time reference, thereby eliminating the need for highly accurate system clocks required in conventional time-synchronized systems. The brief ranging messages can be interleaved with voice and data messages in a non-intrusive manner to provide position location capabilities without disruption of voice and data communications. For example, a messaging protocol similar to that used in Carrier Sense Multiple Access with Collision Avoidance (CSMA/CA) can be used.

To provide high accuracy range estimates, the time of arrival of the ranging messages are precisely estimated. By performing internal delay calibration, errors caused by difficult-to-predict internal transmitter and receiver delay variations can be minimized. These systems use state-of-the-art spread spectrum chipping rates and bandwidths to reduce multipath interference, taking advantage of existing hardware and software to carry out a portion of the TOA estimation processing. Leading edge curve fitting is used to accurately locate the leading-edge of an acquisition sequence in the ranging message in order to further reduce the effect of multipath interference on TOA estimates. Frequency diversity is used to orthogonalize multipath interference with respect to the direct path signal, wherein an optimal carrier frequency is used to estimate the TOA to minimize the impact of multipath interference.

Further, the systems described in these patent documents are self-healing. Unlike conventional systems that require communication with a set of fixed-location reference radios, these systems can use a set of fixed and/or mobile reference radios. The set of radios relied upon to determine the location of a mobile communication device can vary over time depending on transmission conditions and the location of the mobile communication device. Any combination of fixed or mobile radios of known positions can be used as the reference radios for another mobile radio in the system, thereby providing adaptability under varying conditions. The ranging and position determining technique is useful in a wide variety of applications, including location and/or tracking of people and items such as: military personnel and equipment, emergency personnel and equipment, valuable items, vehicles, mobile telephones, children and prisoners.

Referring again to the modem architecture shown in FIG. 1, a data device (not shown) generates an initial digital data stream to be transmitted, and the digital signal is buffered in data buffer 16. The transmitter's modem data I/O 18 receives the digital signal from buffer 16 and supplies the signal to a modem baseband processor 20. Modem baseband processor 20 performs modulation to convert the bits of the input digital signal into symbols at a sample rate of $f_{s1}$ samples per second (sps) and also applies spread spectrum chipping to the symbols at a chipping rate $R_c$ chips per second (cps) to produce a digital baseband direct sequence spread spectrum signal comprising a stream of samples of chips. Modem baseband processor 20 may also conventionally include a convolutional encoder that applies coding to the bits and performs an interleaving function that essentially scrambles the bits to achieve better performance. Each chip is then shaped by the QBLMSK (Quasi Band Limited Minimum Shift Keying) modulator 22 and supplied to a spectral notch modulator 24. The resulting baseband spread spectrum signal is a time-domain signal that, if further processed in a conventional manner (i.e., converted to an analog signal, and up-converted to intermediate frequency and then RF), would be capable of conveying information via the phase shift keying modulation.

Modem transmitter 12 also receives information to be transmitted via spectral notch modulation, which is supplied from the modem data I/O 18 to an encoding module 19 that performs a "bits-to-bins" conversion function. That is, the encoding module maps input information bits into corresponding sets of frequency bins that represent the information bits when excised from the transmit signal. The information is preferably in the form of binary bits, bytes, or words. As used herein and in the claims, the term "information" can by any type of information, including but not limited to: communication information (e.g., data, voice, imaging, video, etc.); data relating to an application running on a processor; navigation data; media access control (MAC) signals; control signals; or overhead signals (e.g., relating to the communication protocol, handshaking, routing, equipment configuration, etc.). Essentially, each piece or block of input information corresponds to a pre-determined set of nulled frequency bins. In the foregoing example, every possible combination of 15 binary bits can be uniquely represented by a corresponding set of 3 nulled bins among 64 total bins. For example, the bit sequence 011001001110100 could be represented by nulling numbered frequency bins 2, 14, and 37. According to one implementation, encoding module 19 can include a look-up table that relates each possible bit sequence to a corresponding unique set of frequency bins. Thus, encoding module identifies the set of frequency bins to be nulled that corresponds to the input information bits and supplies the selected bin numbers to the spectral notch modulator 24 for excision from the transmit signal.

Spectral notch modulator 24 essentially removes frequency components of the baseband spread spectrum signal that correspond to the information bits to be transmitted via spectral notch modulation (i.e., the frequency bins indicated by bits-to-bins encoding module 19). Spectral notch modulator 24 includes a discrete Fourier transform module 26, an excision module 28, and an inverse discrete Fourier transform module 30. Discrete Fourier transform module 26 can be a windowed fast Fourier transform (FFT), while inverse discrete Fourier transform module 30 can be an inverse FFT. Each of these components will be described as they relate to the spectral notch modulation technique and within the context of the spread spectrum modem.

The signal from the baseband modulator (i.e., the stream of baseband chip samples) is supplied from QBLMSK modulator 22 to spectral notch modulator 24, where the baseband digital signal is transformed from the time-domain into the frequency domain by the length N, windowed FFT 26. The length N of the FFT is determined by the desired frequency resolution of the application being addressed, where in general $F_r$ is the frequency resolution and equals $f_{s1}/N$, and $f_{s1}$ is the sampling rate. Each FFT frequency-domain sample corresponds to a frequency bin, with the complete set of frequency bins spanning the spectrum to be used in transmitting the signal. Windowing can be used to shape the frequency response of the FFT bins by providing lower sidelobes at the expense of widening the bandwidth of the bins. Any of the standard windows can be used depending on the application and frequency allocation requirements, such as, for example, any of those described by Harris in "On the Use of Windows for Harmonic Analysis with the Discrete Fourier Transform," Proceedings of the IEEE, Vol. 66, No. 1, the disclosure of which is incorporated herein by reference in its entirety.

The excision operation performed by excision module 28 involves removing the FFT bins at frequencies specified by the encoding module 19 using techniques similar to those described in the open literature for interference excision applications, such as, for example, the excision techniques described by Young in "Analysis of DFT-Based Frequency Excision Algorithms for Direct-Sequence Spread-Spectrum Communications," IEEE Transactions on Communications, Vol. 46, No. 8, the disclosure of which in incorporated herein by reference in its entirety. As shown in FIG. 1, excision module 28 is programmed or receives an input signal from encoding module 19 that indicates the spectral nulling required to modulate the signal, and selectively excises the corresponding frequency bins in the frequency-domain signal. The excision operation generally involves adjusting or setting the signal level of the excised bins at or near zero (i.e., some small level that is easily distinguishable from the signal levels of non-nulled frequency bins). Thus, in the context of non-contiguous spectrum selection, the terms "excise," "exclude," "null," "notch," and "remove," (and other forms thereof) are used herein in relation to segments of the frequency spectrum and associated frequency bins to refer to adjusting of the signal level to a low level, typically near zero.

Importantly, the excision performed by spectral notch modulator 24 is fundamentally different from known excision operations. Conventionally, excision is performed in receivers to eliminate narrowband interference or jamming. Typically, the received signal is analyzed in the frequency domain, and the signal level of each frequency bin is examined. Those frequency bins with exceptionally high signal levels are assumed to be interference or a jamming signal and are either eliminated by zeroing the signal level for those frequency bins or adjusting the signal level to some predetermined value. Unlike interference excision, the excision operation of the invention is performed in the transmitter on signals to be transmitted in order to blank or notch out portions of the signal corresponding to a code that uniquely identifies information bits. Whereas interference excision involves excising frequency bins based on a received signal level, the excision operation of the present invention involves excising or removing a specified set of frequency bins in a transmit signal to selectively perform spectral notch modulation using selected frequency bins within the frequency spectrum of the signal.

Referring again to FIG. 1, after excision, a length N inverse FFT 30 is used to transform the signal back into the time domain, resulting in an excised baseband digital spread spectrum time-domain signal issuing from spectral notch modulator 24. The excised time-domain signal then flows through the rest of the transmitter path as if it were a standard communication or navigation (e.g., ranging) signal. In the exemplary modem shown in FIG. 1, an interpolator 32 adjusts the sampling rate of the samples from spectral notch modulator 24 to a rate that matches a downstream mixer and digital-to-analog converter, increasing the sampling rate from a frequency $f_{s1}$ to frequency $f_s$. The interpolated signal, which is at baseband, is supplied to a digital quadrature mixer 34 that digitally mixes the baseband signal with an intermediate frequency (IF) signal to up-convert the baseband signal to a digital IF signal. The digital IF signal is then converted to an analog signal by digital-to-analog converter 36 and passed through a reconstruction filter 38 comprising a low pass filter or a bandpass filter to produce an output IF signal. After up-conversion to RF, the signal is transmitted via an antenna (not shown). Note that the transmitted signal power can be amplified to compensate for the reduction in signal power due to the excision process. However, since only a few frequency bins are excised in each signal to perform spectral notch modulation, the impact on transmitted signal power is minimal, such that no power compensation may be necessary.

The signal format and transmission parameters of the transmit signal can be selected based on the particular requirements of the signaling system. By way of a non-limiting example, the following parameters can be used with the exemplary spread spectrum modem shown in FIG. 1, and are useful for both communications and navigation (e.g., ranging) applications.

Spread spectrum chip rate=$R_c$=16 Mcps,
Initial sample rate=$f_{s1}$=32 Msps,
N=128,
Hanning window,
3 of 64 bin notching code (equivalent to 15 binary bits),
Interpolated sample rate=$f_s$=128 Msps,
Intermediate frequency=$F_{IF}$=70 MHz, and
Low Pass Filter (LPF) at the Digital-to-Analog Converter (DAC) output.

With these assumptions, the frequency resolution at the FFT output is:

$F_r=f_{s1}/N$=250 kHz, the FFT block size is:

$T_s=1/F_R$=4 µsec, and the 3 dB bandwidth, broadened due to the Hanning window, is:

$BW_{3dB}=1.5 \times F_r$=375 kHz.

The transmitted signal has a −20 dB bandwidth of 16 MHz. Segments of the spectrum that are 375 kHz wide (3 dB BW) can be eliminated from the signal in order to implement spectral notch modulation.

Figure 2:
FIG. 2 illustrates an exemplary waveform that can be employed to transmit and receive time-of-arrival ranging signals and communication signals with the modem architecture shown in FIG. 1.

An exemplary TOA signal format that can be used in the above-described system is shown in FIG. 2. The TOA waveform includes 16 synchronization symbols, each comprising 128 chips, used to acquire the signal at the receiver. The TOA waveform further includes two 1023-chip symbols that can be used for TOA ranging or for communication. In this example, there are sixteen 4 µsec segments per TOA symbol and 32 µsec of overhead for the synchronization symbols, resulting in an effective bit rate of:

$R_b$=15×16 (bits/symbol)×2 (symbols)×1/[(32+2×64)× $10^{-6}$ sec]=3 Mbps.

In one example, spectral notch modulation provides a mechanism for communication between mobile and reference radios during TOA ranging. As previously described, in the aforementioned patents, the quadrature multi frequency ranging (QMFR) algorithm requires a message packet to be sent from the reference communication device back to the mobile communication device after eight ranging packets have been sent (the media access control can employ a CSMA/CA-like scheme with RTS and CRS handshaking). The message packet includes data that is required for the mobile communication device to complete the QMFR algorithm. This message packet can be eliminated and therefore network overhead reduced using spectral notch modulation. The data previously sent in this message packet can be sent using spectral notch modulation on any combination of the ranging packets transmitted from the reference communication device back to the mobile communication device. In addition, there is enough capacity to allow the mobile and reference communication devices to engage in other standard voice, data, and video communications.

Figure 3:
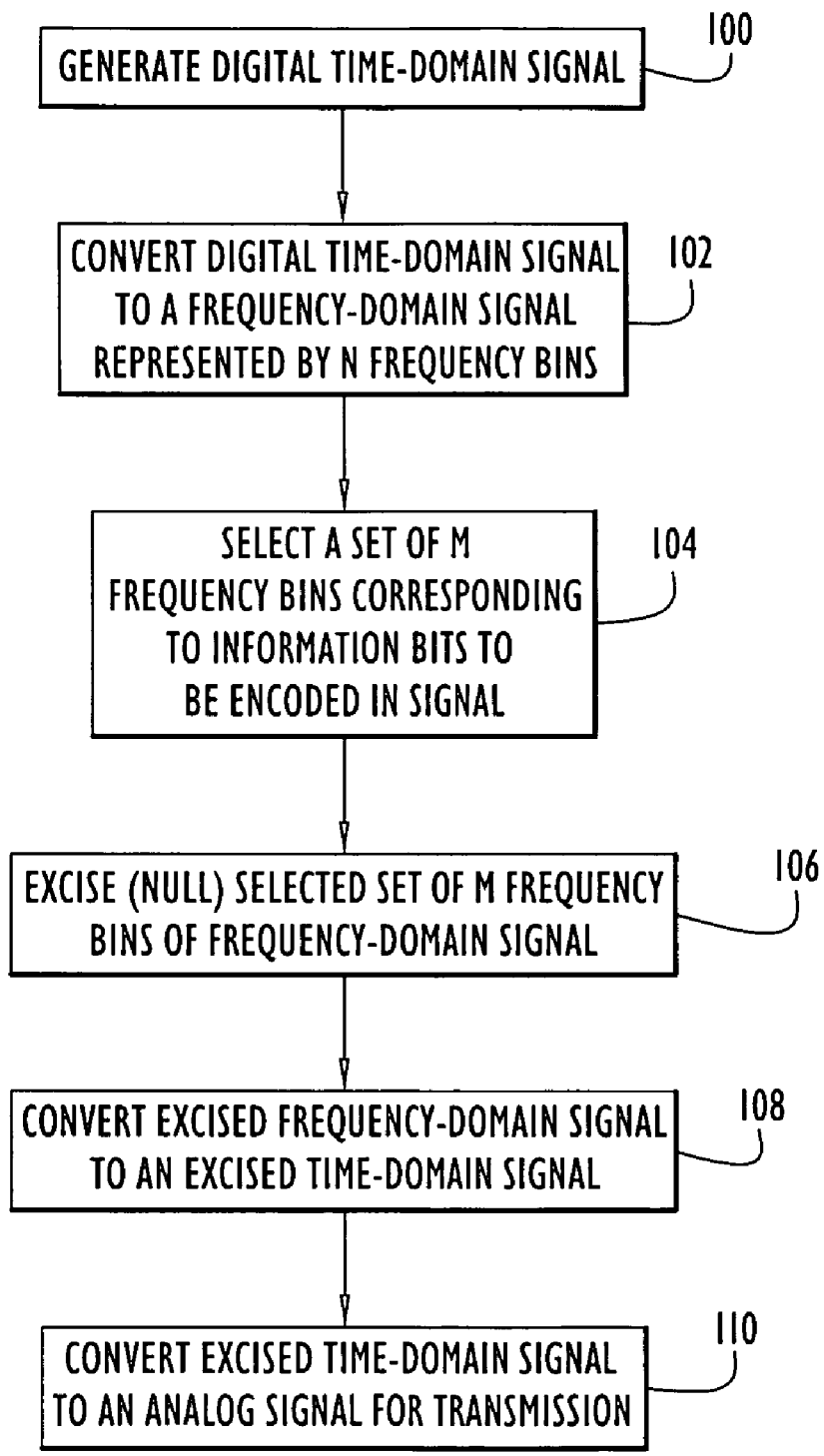
FIG. 3 is a functional flow diagram illustrating modulating a transmit signal via spectral notch modulation in accordance with an exemplary embodiment of the present invention.

The spectral notch modulation operations performed on a transmit signal in the exemplary modem configuration of FIG. 1 are summarized in the functional flow diagram shown in FIG. 3. Specifically, a digital time-domain signal is generated (operation 100) and converted to a frequency domain signal, e.g., by a windowed FFT (operation 102). In operation 104, a set of M frequency bins corresponding to information bits to be encoded in the signal are selected to thereby convert information bits to a corresponding set of frequency bins. Excision is performed on the frequency-domain signal by removing the selected set of frequency bins (operation 106). The excised frequency-domain signal is then converted back to a time-domain signal (operation 108) and converted to an analog signal for transmission (operation 110).

The receiver (demodulator) 14 shown in FIG. 1 is configured to process the spread spectrum signal at the chip rate generated by the transmitter (modulator) 12. The degradation of the strength of the correlation function from the spread spectrum signal in the demodulator (and therefore the ability to perform time-of-arrival ranging and data communication) is proportional to the amount of spectrum excised in the modulator. The aforementioned article by Young shows that the knee of the "percentage of FFT bins excised versus loss" curve is roughly (50%, 7.5 dB) indicating a substantial range of operation for the spectral notch modulation technique.

Receiver 14 is supplied the received IF signal after down-conversion from RF, and converts the IF signal to a digital IF signal via analog-to-digital converter 40. Digital quad mixer 42 down-converts the digital IF signal to baseband, and the sample rate of the digital baseband signal is adjusted from $f_s$ to $f_{s1}$ by decimation in the digital filtering and chip matched filter 44.

In the exemplary modem shown in FIG. 1, the system is capable of transmitting communication signals (e.g., data, audio/voice, video, etc.) interleaved with time-of-arrival ranging signals used for navigation. Thus, after applying gain control to the excised digital baseband received signal in digital automatic gain control (AGC) module 54, the signal is supplied both to a communications acquisition module 62 and a time-of-arrival digital matched filter module 56. When either a communication signal or a ranging signal is received, the communication acquisition module 62 acquires the timing of the signal. In the case of a ranging signal, the communications acquisition module triggers the TOA DMF module 56 to precisely determine the time of arrival of the ranging pulse. Once the TOA DMF module 56 correlates the ranging signal by matching the signal with the appropriate correlation function, the resulting signal timing information (TOA data) is sent to the modem processor 58 (supported by memory 60), which computes range and determines position. A detailed description of an example of these modules is contained in the aforementioned patent documents.

For communication signals such as media access control signals (e.g., request-to-send (RTS) messages, clear-to-send (CTS) messages, acknowledge (ACK) messages, etc.) which are sent via conventional modulation techniques in certain packets, the acquired signal is supplied from the communications acquisition module 62 to a differential RAKE equalizer 64 that identifies the predominant multipath channels and sums the multipath signals appropriately time-delayed to increase the combined signal-to-noise ratio for communications performance improvement. A de-interleaver and decoder 66 essentially decodes and deinterleaves (descrambles) the coding and interleaving functions applied in the modem baseband processor. The resulting digital signal is then supplied to modem processor 58 where the final bits are accumulated and supplied to a destination application (e.g., a data, voice or video application). In the example shown in FIG. 1, media access control data can be conveyed in this manner.

Information encoded in the received signal via spectral notch modulation can be recovered as follows. In the case where spectral notch modulation is encoded in a TOA ranging signal, the output of the TOA digital matched filter 56 is supplied to an FFT module 50 that converts the bandband signal to the frequency domain via an N point FFT (i.e., having N frequency bins), corresponding to the FFT size used in the spectral notch modulator 24. Like TOA DMF 56, FFT module 50 is triggered by communications acquisition module 62 upon detection of a TOA ranging signal. The output of FFT module 50 is supplied to a bin search and bins-to-bits conversion module 52, which searches the N FFT frequency bins to find which M of these frequency bins were excised (nulled) prior to transmission. This process can be performed, for example, by comparing the sample values to expected values that would have been received had no excision been performed and identifying the frequency bins whose signal values are lowest relative to the expected, non-excised values.

Once the excised frequency bins have been identified, the search and conversion module 52 identifies the information bits that correspond to the set of excised frequency bins. This can be accomplished, for example, using a look-up table that relates each possible combination of excised frequency bins to a corresponding sequence of information bits in a one-to-one correspondence. These information bits are then supplied to the modem processor 58 for further processing. In the example shown in FIG. 1, communications data that supports the TOA ranging process can be conveyed to a receiver in this manner, thereby obviating the need for a separate message packet to be sent at the conclusion of a ranging sequence. Due to the use of spectral notch modulation, this communications data can be derived from the same portion of the TOA ranging packet that was used previously for TOA ranging only.

While receiver 14 has been described herein as including various modules and processors (e.g., 50, 52, 56, 58, 60, 62, 64, 66), the designations of "module" and "processor" are used principally for descriptive purposes and should not be interpreted to suggest that separate circuitry or processing elements are required for each. For example, the various modules and processors shown in FIG. 1 could be implemented using virtually any combination of hardware and software involving one or more processors.

In the above-described example, spectral notch modulation is applied to TOA ranging message, as suggested by the FFT module 50 receiving the output of the TOA DMF 56. More generally, spectral notch modulation could be performed on any signal by supplying the baseband signal to the FFT module 50 any time an arriving signal is detected by communications acquisition module 62.

Figure 4:
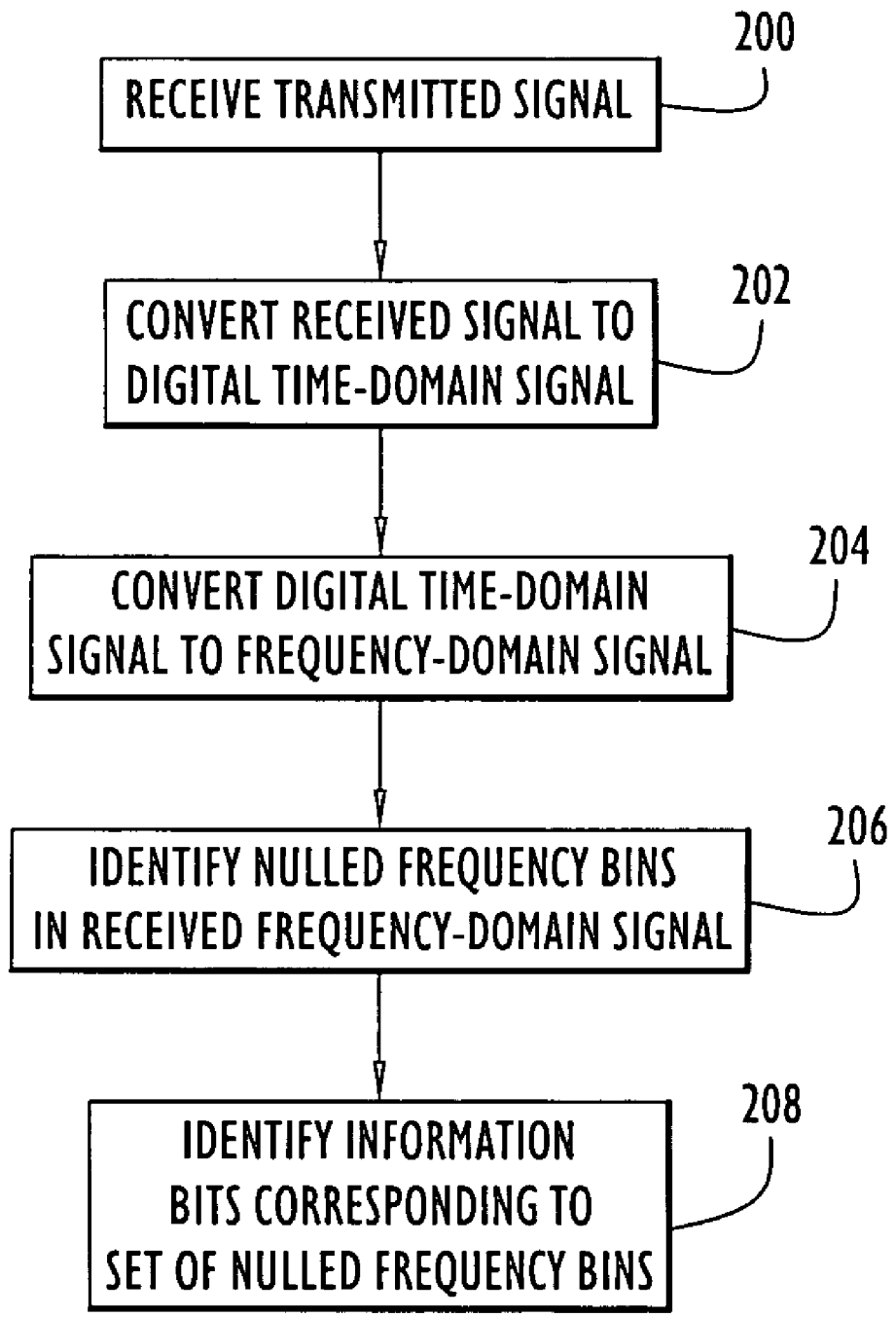
FIG. 4 is a functional flow diagram illustrating reception and demodulation of signal containing information encoded via spectral notch modulation in accordance with an exemplary embodiment of the present invention.

The operations performed in recovering information bits encoded in a received signal via spectral notch modulation are summarized in the flow diagram of FIG. 4. In operation 200, a signal is received, and in operation 202, the signal is converted to a digital time-domain signal. The digital time-domain signal is then converted to a frequency-domain signal (operation 204). In operation 206, the nulled frequency bins are identified in the frequency-domain signal, and in operation 208, the information bits corresponding to the set of nulled frequency bins are identified.

The spectral notch modulation technique may be particularly desirable where the underlying signal, while encoded with binary bits and/or DSSS chips, is essentially an overhead signal in the communication scheme and therefore does not contribute to throughput of useful end-user data. For example, two radios may exchange audio signals (voice messages) and/or data signals interleaved with ranging signals (e.g., time-of-arrival (TOA) "ping" messages that enable determination of round-trip delay and hence range between the radios). From the standpoint of sending voice and data messages between the radios, these TOA messages represent overhead that reduces throughput. By overlaying spectral notch modulation on the TOA messages, these messages can be used both for determining range between the radios, while also sending data via the spectral notch modulation. Likewise, spectral notch modulation can be applied to any type of overhead signals, or for that matter any transmitted signals, including signals carrying end user data. Optionally, overhead-type information can be encoded onto data signals via spectral notch modulation.

While the exemplary embodiment involves the example of a TOA ranging and communication system employing DSSS signals, it will be appreciated that the technique of spectral notch modulation can be applied to a wide variety of signals and signaling systems, and the invention is not limited to TOA ranging application. Spectral notch modulation can be applied to virtually any type of signal that can be digitized and excised in the frequency domain. When used in combination with conventional modulation techniques, additional information throughput is achieved without increasing signal bandwidth, power, or data rates. Further, a conventional modulation technique can be used to convey one type of information (e.g., data of interest to an end user) and spectral notch modulation can be used to convey another type of information (e.g., overhead or control signals).

The spectral notch modulation technique can be implemented in a system that easily fits within the physical footprint of mobile communication device, such as a handheld spread spectrum radio, permitting the system to be used in a wide variety of applications. Where the system supports both communications and navigation, as in the exemplary embodiment, the system can be used to provide situation awareness in military exercises, to determine and track the location of military personnel and/or equipment during coordination of field operations. This would be particularly useful in scenarios where GPS signals are weak or unavailable due to atmospheric conditions, terrain or location of the radio inside a building, or to augment and enhance the accuracy of GPS position information. The position information can be used by a commander to dynamically map the current position of personnel and equipment and to coordinate further movements. Further, individual mobile radios can receive and display position information for other related personnel, so that soldiers in the field are provided with situation awareness for their immediate surroundings.

The spectral notch modulation technique of the present invention can also be used to enhance systems that locate and track non-military personnel and resources both indoors or outdoors, including but not limited to: police engaged in tactical operations; firefighters located near or within a burning building; medical personnel and equipment in a medical facility or en route to an emergency scene; and personnel involved in search and rescue operations. The spectral notch modulation technique is also useful in systems used to track high-value items by tagging items or embedding a mobile radio in items such as personal computers, laptop computers, portable electronic devices, luggage (e.g., for location within an airport), briefcases, valuable inventory, and stolen automobiles.

In urban environments, where conventional position determining systems have more difficulty operating, the spectral notch modulation technique can be used to support systems that track fleets of commercial or industrial vehicles, including trucks, buses and rental vehicles equipped with mobile radios. Tracking of people carrying a mobile communication device is also desirable in a number of contexts, including, but not limited to: children in a crowded environment such as a mall, amusement park or tourist attraction; location of personnel within a building; location of prisoners in a detention facility; or to track the movements of parolees. The mobile radio could be carried on the body by incorporating the radio into clothing, such as a bracelet, a necklace, a pocket or the sole of a shoe. The spectral notch modulation technique can also be applied in systems used in locating the position of cellular telephones. This capability could also be used to assist in cell network management (e.g., in cell handoff decisions).

Of course, the spectral notch modulation technique is equally applicable in communication devices and networks of communication devices that transmit and receive only communication signals (e.g., data, audio, video), only navigation signals, or virtually any type of spread spectrum or wideband signal. Further, the spectral notch modulation technique can be used in fixed-position communication devices that transmit as well as mobile communication devices.

While the present invention has been described above in the context of a system that transmits and receives electromagnetic signals through the air, it will be appreciated that the spectral notch modulation technique of the present invention can be used in other mediums and with other types of signals, including, but not limited to: electromagnetic signals transmitted through solid materials, water or in a vacuum; and pressure waves or acoustic signals transmitted through any medium (e.g., seismic, sonar or ultrasonic waves).

Having described preferred embodiments of new and improved methods and apparatus for encoding information in a signal by spectral notch modulation, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method of modulating a signal to encode information, comprising:
    modulating the signal in the time domain using a first modulation scheme to encode first information in the signal;
    transforming the time-domain modulated signal into the frequency domain via a fast Fourier transform (FFT) of length N, such that the frequency-domain signal is represented by N frequency bins;
    mapping information bits to a corresponding code comprising a set of M frequency bins that represent the information bits, the code being defined by identities of a particular combination of frequency bins that constitute the set, such that different combinations of M frequency bins constitute different codes that represent different information bits;
    modulating the frequency-domain signal in the frequency domain using a second modulation scheme to encode second information in the signal by selectively nulling the M frequency bins from the signal represented by the N frequency bins, where M is greater than one and less than N to encode the information bits in the signal via the code defined by the particular combination of M frequency bins, wherein the number of information bits encoded by nulling the M frequency bins is greater than M;
    transforming the selectively nulled signal to the time domain via an inverse FFT; and
    transmitting the selectively hulled signal containing the first information and the second information.

2. The method of claim 1, wherein the signal is a spread spectrum signal.

3. The method of claim 1, wherein the first modulation scheme includes at least one of: phase shift keying, frequency shift keying, quadrature amplitude modulation, amplitude modulation, frequency modulation.

4. The method of claim 3, wherein the signal is encoded with a first type of information via the first modulation scheme, and the signal is encoded with a second type of information via the second modulation scheme.

5. The method of claim 4, wherein the first and second types of information are selected from the group consisting of: time-of-arrival ranging signals, navigation signals, communications data, video signals, audio signals, overhead signals, control signals, handshaking signals, media access control signals, and alphanumeric data.

6. A method of demodulating a signal to recover information encoded in the signal via spectral notch modulation, comprising:
    transforming the signal into a frequency domain signal via a fast Fourier transform (FFT) of length N, such that the frequency domain signal is represented by N frequency bins;
    identifying from the frequency domain signal a set of M nulled frequency bins among the N frequency bins, where M is greater than one and less than N and wherein a determination of which of the N frequency bins are the M nulled frequency bins is made from analysis of the frequency domain signal, wherein identities of the M nulled frequency bins, in combination, define a code that represents a number of information bits greater than M, such that different combinations of M frequency bins constitute different codes that represent different information bits;
    converting the set of M nulled frequency bins to corresponding information bits;
    transforming the frequency domain signal to the time domain via an inverse FFT; and
    demodulating the time domain signal to recover additional information encoded in the signal via modulation applied to the signal in the time domain.

7. The method of claim 6, wherein the signal is a spread spectrum signal.

8. The method of claim 6, wherein demodulating the time domain signal includes recovering information modulated via at least one of: phase shift keying, frequency shift keying, quadrature amplitude modulation, amplitude modulation, frequency modulation.

9. An apparatus for encoding information in a signal by spectral notch modulation, comprising:
    a processor configured to generate a digital time-domain signal having a bandwidth that is divisible into frequency bins; a modulator configured to modulate the digital time-domain signal in the time domain using a first modulation scheme to encode first information in the signal;
    an encoding module configured to map information bits to a corresponding code comprising a set of frequency bins that represent the information bits, the code being defined by identities of a particular combination of frequency bins that constitute the set, such that different combinations of frequency bins constitute different codes that represent different information bits, wherein the number of information bits represented by the code is greater than the number of frequency bins that constitute the set;

a spectral notch modulator that converts the modulated digital time-domain signal to a frequency-domain signal, modulates the frequency-domain signal domain using a second modulation scheme to encode second information in the signal by excising from the frequency-domain signal the set of frequency bins selected by the encoding module to encode the information bits via the code defined by the particular combination of frequency bins, and converts the excised frequency-domain signal to an excised time-domain signal; and a digital-to-analog converter that converts the excised time-domain signal to an analog signal for transmission.

10. The apparatus of claim 9, wherein the frequency domain signal includes N frequency bins and the spectral notch modulator excises M of the N frequency bins, wherein nulled combinations of M frequency bins respectively correspond to encoded information bits.

11. The apparatus of claim 9, wherein the spectral notch modulator comprises:

a discrete Fourier transform module that converts the digital time-domain signal to the frequency-domain signal, wherein the frequency-domain signal comprises a plurality of frequency-domain samples corresponding to respective frequency bins;

an excision module that selectively removes the frequency bins selected by the encoding module to cause spectral nulling of the frequency bins selected by the encoding module; and an inverse discrete Fourier transform module that converts the excised frequency-domain signal to the excised time-domain signal.

12. The apparatus of claim 11, wherein the discrete Fourier transform module comprises a fast Fourier transform (FFT) and the inverse discrete Fourier transform module comprises an inverse FFT.

13. The apparatus of claim 9, wherein digital time-domain signal is a baseband signal, the system further comprising:

a digital mixer that up-converts the excised time-domain signal to an intermediate frequency signal and supplies the intermediate frequency signal to the digital-to-analog converter.

14. The apparatus of claim 13, further comprising a reconstruction filter that receives the analog signal from the digital-to-analog converter and supplies a filtered intermediate signal to an RF transmission module.

15. The apparatus of claim 9, wherein the digital time-domain signal is a spread spectrum signal comprising a sequence of samples of chips.

16. The apparatus of claim 9, wherein the signal comprises a ranging waveform for determining a range between two communication devices.

17. The apparatus of claim 9, wherein the apparatus is a mobile communication device.

18. The apparatus of claim 9, wherein the apparatus communicates with a plurality of communication devices in a network.

19. An apparatus for demodulating a signal to recover information encoded in the signal via spectral notch modulation, comprising:

an analog-to-digital converter configured to convert a received signal to a received digital time-domain signal; and a processor configured to: convert the received digital time-domain signal to a frequency-domain signal comprising a plurality of frequency-domain samples corresponding to respective frequency bins; identify a subset of the frequency bins that were nulled to effect the spectral notch modulation, wherein identities of the nulled frequency bins forming the subset, in combination, define a code that represents encoded information bits, such that different combinations of frequency bins constitute different codes that represent different information bits, wherein the number of information bits represented by the code is greater than the number of frequency bins in the subset that defines the code, and wherein identification of which frequency bins were nulled is determined from analysis of the frequency-domain signal; and convert the subset of the frequency bins to corresponding information bits based on the combination of frequency bins that form the subset, wherein the processor is further configured to convert the frequency-domain signal to a time-domain signal and demodulate the time-domain signal to recover additional information encoded in the received signal via modulation applied in the time domain.

20. The apparatus of claim 19, wherein the frequency domain signal includes N frequency bins, and M of the N frequency bins are nulled, wherein nulled combinations of M frequency bins respectively correspond to encoded information bits.

21. The apparatus of claim 19, further comprising a time of arrival processor that determines a time of arrival of the received signal from the received time-domain signal.

22. The system of claim 19, further comprising a communications acquisition processor that acquires the received signal from the received time-domain signal.

23. A system for conveying information encoded in a signal by spectral notch modulation, comprising:

means for generating a digital time-domain signal having a bandwidth that is divisible into frequency bins;

means for modulating the signal in the time domain using a first modulation scheme to encode first information in the signal;

means for mapping information bits to a corresponding code comprising a set of frequency bins that represent the information bits, the code being defined by identities of a particular combination of frequency bins that constitute the set, such that different combinations of frequency bins constitute different codes that represent different information bits, wherein the number of information bits represented by the code is greater than the number of frequency bins in the set that defines the code;

means for converting the modulated digital time-domain signal to a frequency-domain signal;

means for modulating the frequency-domain signal domain using a second modulation scheme to encode second information in the signal by excising from the frequency-domain signal the set of frequency bins selected by the means for mapping to encode the information bits via the code defined by the particular combination of frequency bins;

means for converting the excised frequency-domain signal to an excised time-domain signal; and means for converting the excised time-domain signal to an analog signal for transmission.

24. The system of claim 23, further comprising:
- means for converting the analog signal to a received digital time-domain signal;
- means for converting the received digital time-domain signal to a received frequency-domain signal comprising a plurality of frequency-domain samples corresponding to respective frequency bins;
- means for identifying the set of frequency bins that were excised, wherein identification of which frequency bins were excised is determined from analysis of the received frequency-domain signal;
- means for converting the set of the frequency bins to corresponding information bits based on the combination of frequency bins that form the set;
- means for converting the received frequency-domain signal to a time-domain signal; and
- means for demodulating the time-domain signal to recover additional information encoded in the signal via modulation applied to the signal in the time domain.

25. The method of claim 1, wherein nulling of the M frequency bins includes setting a signal level of the M frequency bins to zero or near zero.

26. The apparatus of claim 9, wherein the spectral notch modulator excises the set of frequency bins by setting a signal level of each frequency bin in the set to zero or near zero.

27. The apparatus of claim 23, wherein the means for excising excises the set of frequency bins by setting a signal level of each frequency bin in the set to zero or near zero.

28. A method of modulating a signal to encode information, comprising:
- transforming the signal into the frequency domain via a fast Fourier transform (FFT) of length N, such that the frequency-domain signal is represented by a set of N frequency bins;
- mapping information bits to a corresponding code comprising a set of M frequency bins that represent the information bits, the code being defined by identities of a particular combination of frequency bins that constitute the set of M frequency bins, such that different combinations of M frequency bins constitute different codes that represent different information bits;
- selectively nulling the M frequency bins from the signal represented by the N frequency bins, where M is greater than one and less than N, to encode the information bits in the frequency-domain signal via the code defined by the particular combination of M frequency bins, wherein the number of bits encoded by nulling M frequency bins is greater than M and is a function of the number of different combinations of M frequency bins within the set of the N frequency bins;
- transforming the selectively nulled signal to the time domain via an inverse FFT; and
- transmitting the selectively nulled signal.

* * * * *

UNITED STATES PATENT AND TRADEMARK OFFICE
CERTIFICATE OF CORRECTION

PATENT NO. : 7,746,939 B2  Page 1 of 1
APPLICATION NO. : 11/191910
DATED : June 29, 2010
INVENTOR(S) : Dennis D. McCrady It is certified that error appears in the above-identified patent and that said Letters Patent is hereby corrected as shown below:

Column 14, line 6, replace "selectively hulled signal" with -- selectively nulled signal --.

Signed and Sealed this

Thirty-first Day of August, 2010

David J. Kappos
*Director of the United States Patent and Trademark Office*